(12) United States Patent
Kim

(10) Patent No.: US 12,395,606 B2
(45) Date of Patent: Aug. 19, 2025

(54) A/V RECEPTION APPARATUS AND WIRELESS DISPLAY SYSTEM

(71) Applicant: LG ELECTRONICS INC., Seoul (KR)

(72) Inventor: Dongsung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 18/574,496

(22) PCT Filed: Jul. 15, 2021

(86) PCT No.: PCT/KR2021/009095
§ 371 (c)(1),
(2) Date: Dec. 27, 2023

(87) PCT Pub. No.: WO2023/286889
PCT Pub. Date: Jan. 19, 2023

(65) Prior Publication Data
US 2024/0340389 A1    Oct. 10, 2024

(51) Int. Cl.
*H04N 7/01* (2006.01)
*G06T 7/00* (2017.01)
(Continued)

(52) U.S. Cl.
CPC ......... *H04N 7/0125* (2013.01); *G06T 7/0002* (2013.01); *G06V 10/25* (2022.01); *H04N 21/4402* (2013.01)

(58) Field of Classification Search
CPC ............. H04N 7/0125; H04N 21/4402; H04N 17/004; H04N 21/43637; H04N 21/4854;
(Continued)

(56) References Cited

U.S. PATENT DOCUMENTS 10,825,140 B1 * 11/2020 Yang ...................... H04N 19/48
2015/0319416 A1    11/2015 Nakajima
(Continued)

FOREIGN PATENT DOCUMENTS

CA    2237814 C  * 10/2002 ........... G10L 19/018
JP    11-136642 A    5/1999
(Continued)

*Primary Examiner* — Michael Lee
(74) *Attorney, Agent, or Firm* — Birch, Stewart, Kolasch & Birch, LLP

(57) ABSTRACT

An A/V reception apparatus according to an embodiment of the present disclosure may comprise: a display; a radio frequency (RF) reception module that receives a compressed RF packet from an A/V transmission apparatus, the compressed RF packet including a video frame corresponding to a content video, and AI picture quality information regarding an AI picture quality region indicating at least a partial region of the content video; and a microcomputer that acquires a value of a picture quality factor of the AI picture quality region on the basis of the AI picture quality information, transmits the value of the picture quality factor to the A/V transmission apparatus, receives, from the A/V transmission apparatus, a picture quality correction value in which the value of the picture quality factor of the AI picture quality region has been corrected, and outputs the video frame via the display on the basis of the received picture quality correction value.

13 Claims, 8 Drawing Sheets

(51) Int. Cl.
*G06V 10/25* (2022.01)
*H04N 21/4402* (2011.01)

(58) Field of Classification Search
CPC .... H04N 21/43615; H04N 9/68; H04N 17/02; H04N 21/2343; H04N 21/426; G06T 7/0002; G06V 10/25
See application file for complete search history.

(56) References Cited

U.S. PATENT DOCUMENTS

| | | | |
|---|---|---|---|
| 2020/0005100 | A1 | 1/2020 | Kim |
| 2020/0014603 | A1 | 1/2020 | Kuo et al. |
| 2020/0322694 | A1* | 10/2020 | Colligan .......... H04N 21/64784 |
| 2021/0092479 | A1* | 3/2021 | Namba ................ G06V 10/764 |
| 2021/0150287 | A1* | 5/2021 | Baek .................. G06F 18/2415 |
| 2021/0256658 | A1* | 8/2021 | Kim ...................... G06T 3/4046 |
| 2022/0312019 | A1* | 9/2022 | Kubota .................. G06V 10/82 |
| 2023/0075881 | A1* | 3/2023 | Park .......................... G06T 5/20 |
| 2023/0281755 | A1* | 9/2023 | Yang ........................ G06N 3/08 |
| | | | 382/100 |

FOREIGN PATENT DOCUMENTS

| | | | |
|---|---|---|---|
| KR | 10-2019-0104927 A | 9/2019 | |
| KR | 10-2054453 B1 | 12/2019 | |
| KR | 10-2021-0060672 A | 5/2021 | |
| KR | 10-2269034 B1 | 6/2021 | |
| KR | 10-2276636 B1 | 7/2021 | |
| WO | WO-2019197715 A1 * | 10/2019 | ........... G06N 3/0454 |
| WO | WO-2022159729 A1 * | 7/2022 | ........... G06V 10/454 |

\* cited by examiner

LOS (Line Of Sight) CONDITION

NLOS (Non-Line Of Sight) CONDITION

|  | LOS CONDITION - SNR | NLOS CONDITION - SNR |
|---|---|---|
| NON PERFORMANCE OF AI PICTURE QUALITY CORRECTION | 30dB | 10dB |
| PERFORMANCE OF AI PICTURE QUALITY CORRECTION | 30dB | 30dB |

FIG. 10

|  | LOS CONDITION - COMPRESSION RATIO | NLOS CONDITION - COMPRESSION RATIO |
| --- | --- | --- |
| NON PERFORMANCE OF AI PICTURE QUALITY CORRECTION | 8 | 16 |
| PERFORMANCE OF AI PICTURE QUALITY CORRECTION | 8 | 8 |

A/V RECEPTION APPARATUS AND WIRELESS DISPLAY SYSTEM

CROSS REFERENCE TO RELATED APPLICATIONS

This application is the National Phase of PCT International Application No. PCT/KR2021/009095, filed on Jul. 15, 2021, all of which is hereby expressly incorporated by reference into the present application.

TECHNICAL FIELD

The present disclosure relates to a wireless display system that transmits and receives A/V data wirelessly.

BACKGROUND ART

As video technology has changed from analogue to digital, evolution has been made from SD (Standard-Definition) to HD (Hi-Definition) to provide more realistic video closer to actual scenes. SD supports a resolution of 704×480 and consists of about 350,000 pixels, while HD is classified into HD and Full HD, of which Full HD supports a higher resolution of 1920×1080 and consists of 2 million pixels, providing significantly higher quality videos compared to SD.

In recent years, video technology has grown beyond Full HD to Ultra High-Definition (UHD), and UHD, which supports ultra-high definition and ultra-high resolution, is attracting attention as the next generation media environment. UHD supports 4K (3840×2160) and 8K (7680×4320) resolutions and up to 22.2 channels of surround audio. Compared to HD, UHD provides four times clearer picture quality in 4K UHD, and 16 times clearer picture quality in 8K UHD.

Recently, wireless display systems have emerged that transmit high-resolution images to display devices via wireless.

A wireless display system is a system that transmits and receives A/V data between an A/V transmission apparatus and an A/V reception apparatus through a local area network.

The A/V reception apparatus displays the A/V data received from the A/V transmission apparatus.

The A/V transmission apparatus may also transmit video data to which artificial intelligence picture quality has been applied. Image quality to which artificial intelligence (AI) is applied refers to adjusting the values of certain quality factors in a partial region constituting a video differently from the values of certain quality factors in surrounding regions.

When transmitting video data to which AI picture quality is applied, the picture quality of a relevant region may decrease due to packet loss caused by the deterioration of network environment.

In other words, when the compression ratio of packets increases as the network environment deteriorates, the picture quality of a region to which the AI quality factor value is applied may decrease.

DISCLOSURE OF INVENTION

Technical Problem

The present disclosure aims to enable a transmission apparatus to maintain optimal AI picture quality when the transmission apparatus transmits a video including an AI image quality region in a wireless display system.

The present disclosure aims to enable a transmission apparatus to maintain optimal AI image quality regardless of network environment when the transmission apparatus transmits a video including an AI image quality region in a wireless display system.

Technical Solution

According to an embodiment of the present disclosure, an Audio/Video (A/V) reception apparatus includes a display, a radio frequency (RF) reception module that receives a compressed RF packet from an A/V transmission apparatus, the compressed RF packet including a video frame corresponding to a content video, and AI picture quality information regarding an AI picture quality region indicating at least a partial region of the content video, and a microcomputer that acquires a value of a picture quality factor of the AI picture quality region on the basis of the AI picture quality information, transmits the value of the picture quality factor to the A/V transmission apparatus, receives, from the A/V transmission apparatus, a picture quality correction value in which the value of the picture quality factor of the AI picture quality region has been corrected, and outputs the video frame via the display on the basis of the received picture quality correction value.

According to an embodiment of the present disclosure, a wireless display system includes an audio/video (A/V) transmission apparatus that generates a radio frequency (RF) packet, compress a generated RF packet and transmits a compressed RF packet to an A/V reception apparatus via RF communication, the compressed RF packet including a video frame corresponding to a content video, and AI picture quality information regarding an AI picture quality region indicating at least a partial region of the content video, and the A/V reception apparatus that acquires a value of a picture quality factor of the AI picture quality region on the basis of the AI picture quality information, transmits the value of the picture quality factor to the A/V transmission apparatus, receives, from the A/V transmission apparatus, a picture quality correction value in which the value of the picture quality factor of the AI picture quality region has been corrected, and outputs the video frame via a display on the basis of the received picture quality correction value.

Advantageous Effects

According to an embodiment of the present disclosure, a video with consistent AI picture quality may be provided even when the network environment is poor.

Accordingly, users may watch videos with AI quality applied without significant influence by the network environment.

BRIEF DESCRIPTION OF DRAWINGS

FIGS. 7 to 10 are diagrams showing comparison of measured SNR and compression ratio when AI picture quality correction is performed under LOS (Line Of Sight) conditions and NLOS (Non-Line Of Sight) conditions.

BEST MODE FOR CARRYING OUT THE INVENTION

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

An audio/video (A/V) transmission apparatus according to an embodiment of the present disclosure, for example, as an artificial device that adds a computer supporting function to a broadcast receiving function, can have an easy-to-use interface such as a writing input device, a touch screen, or a spatial remote control device as an Internet function is added while fulfilling the broadcast receiving function.

Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, an A/V transmission apparatus described herein, for example, can perform various user-friendly functions.

Figure 1:
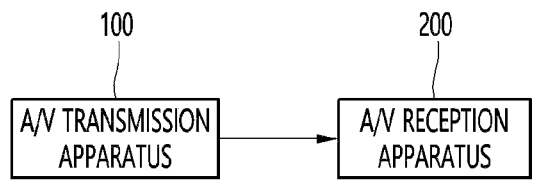
FIGS. 1 and 2 are diagrams for describing a configuration of a wireless display system according to an embodiment of the present disclosure.
Figure 2:
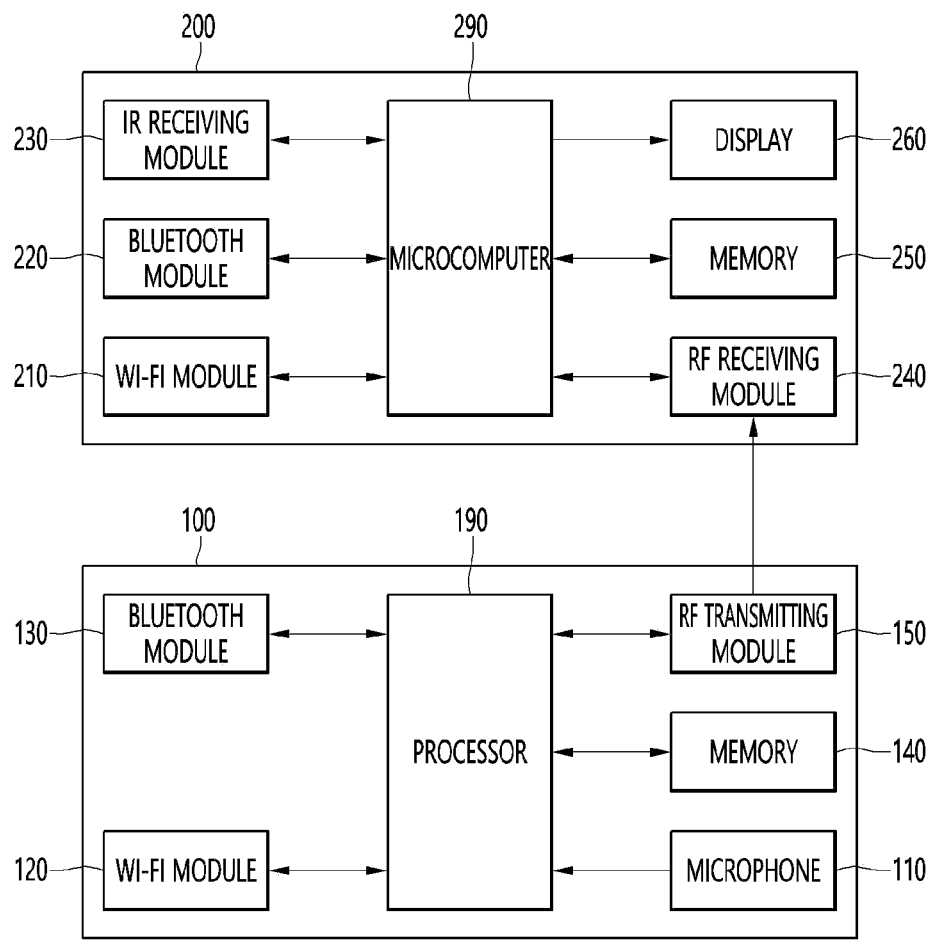

FIGS. 1 and 2 are diagrams for describing a configuration of a wireless display system according to an embodiment of the present disclosure.

Referring to FIG. 1, a wireless display system 1 according to an embodiment of the present disclosure may include an A/V transmission apparatus 100 and an A/V reception apparatus 200.

The wireless display system 1 may be a system in which the A/V transmission apparatus 100 wirelessly transmits A/V data to the A/V reception apparatus 200, and the A/V reception apparatus 200 outputs the A/V data.

The A/V transmission apparatus 100 may be a device capable of encoding video and audio and transmitting the encoded content video and audio in a wireless manner.

The A/V transmission apparatus 100 may be a set-top box.

The A/V transmission apparatus 100 may be connected to an external device such as a set-top box or a USB memory. The A/V transmission apparatus 100 may transmit a video signal or an audio signal received from the connected external device to the A/V reception apparatus 200.

The A/V reception apparatus 200 may be a display apparatus capable of wirelessly receiving an encoded video and audio and decoding the received video and audio.

The A/V transmission apparatus 100 and the A/V reception apparatus 200 may constitute a video wall display system.

In a video wall, a display having a thin bezel plays an important role in the visualization of content images. For a thin bezel of a display, it is efficient that components capable of minimal functions are only provided and a circuit or a component for a main function is provided in a separate device.

The A/V transmission apparatus 100 may determine a type of the content image input from the outside, and determine a compression ratio of the content image based on the determined type. The compression ratio of a content video may be defined as the ratio of the size of video data before encoding to the size of video data after encoding.

The type of the content image may include a still image type, a general video type, and a game video type.

The A/V transmission apparatus 100 may compress the content video according to the determined compression ratio, and wirelessly transmit the compressed content video to the A/V reception apparatus 200.

The A/V reception apparatus 200 may restore the compressed content video received from the A/V transmission apparatus 100 and display the restored content video on the display.

FIG. 2 is a block diagram illustrating detailed configurations of the A/V transmission apparatus 100 and the A/V reception apparatus 200.

Referring to FIG. 2, the A/V transmission apparatus 100 may include a microphone 110, a Wi-Fi module 120, a Bluetooth module 130, a memory 140, an RF transmitting module 150 and a processor 190.

The microphone 110 may receive an audio signal and transmit the audio signal to the processor 190.

The microphone 110 may receive a speech uttered by a user.

The Wi-Fi module 120 may perform wireless communication through the Wi-Fi standard. The Bluetooth module 120 may perform wireless communication with an external device or the A/V reception apparatus 200 through the Wi-Fi standard.

The Bluetooth module 130 may perform wireless communication through the Bluetooth Low Energy (BLE) standard.

The Bluetooth module 130 may perform wireless communication with an external device such as a remote control or the A/V reception apparatus 200 through the Bluetooth Low Energy (BLE) standard.

The memory 140 may store a program for signal processing and control and store a signal-processed video, audio, or data signal.

The memory 140 may perform a function for temporarily storing video, audio, or data signals input from the outside, and store information on a predetermined image through a channel storage function.

The RF transmitting module 150 may transmit an A/V signal to an RF receiving module 240 of the A/V reception apparatus 200 through RF (Radio Frequency) communication.

The RF transmitting module 150 may include one or more antennas.

The RF transmitting module 150 may transmit a compressed A/V signal in digital form to the RF receiving module 240.

The RF transmitting module 150 may transmit an A/V signal to the RF receiving module 240 through one or more channels.

The processor 190 may control overall operation of the A/V transmission apparatus 100. The processor 190 may be configured in the form of a system on chip (SoC).

A plurality of processors 190 may be provided.

The processor 190 may compress an externally input video signal or audio signal and transmit the compressed signal to the RF transmitting module 150.

The processor 190 may include an encoder for compressing a video signal or an audio signal.

The processor 190 may be referred to as a main SoC.

The processor 190 may include one or more interfaces for connection with an external device. For example, the processor 190 may include one or more HDMI ports and one or more USB ports.

The processor 190 may include a tuner for receiving a broadcast signal.

The A/V receiving apparatus 200 may include a Wi-Fi module 210, a Bluetooth module 220, an IR module 230, an RF receiving module 240, a memory 250, a display 260, and a microcomputer 290.

The Wi-Fi module 210 may perform wireless communication through the Wi-Fi standard.

The Wi-Fi module 120 may perform wireless communication with an external device or the A/V transmission apparatus 100 through the Wi-Fi standard.

The Bluetooth module 220 may perform wireless communication through the Bluetooth Low Energy (BLE) standard.

The Bluetooth module 220 may perform wireless communication with an external device such as a remote control or the A/V transmission apparatus 200 through the Bluetooth Low Energy (BLE) standard.

The IR module 230 may receive a signal from the remote control 300 to be described later through IR (Infrared) communication.

The RF receiving module 240 may receive an A/V signal from the RF transmitting module 150.

The RF receiving module 240 may include a plurality of antennas. The RF receiving module 240 may be disposed at the lower end of the display 260.

The RF receiving module 240 may include a first antenna module and a second antenna module. Each of the first antenna module and the second antenna module may include a plurality of antennas.

The RF receiving module 240 may receive a compressed A/V signal in digital form from the RF transmitting module 150 and transmit the received A/V signal to the microcomputer 290.

The memory 250 may store a program for signal processing and control and store a signal-processed video, audio, or data signal.

The display 260 may display a video signal received from the microcomputer 290.

The display 260 may display a video signal according to the operation of a timing controller (not shown).

The microcomputer 290 may control the overall operation of a display device 200.

The microcomputer 290 may decompress the compressed A/V signal received by the RF receiving module 240. To this end, the microcomputer 290 may include a decoder.

Figure 3:
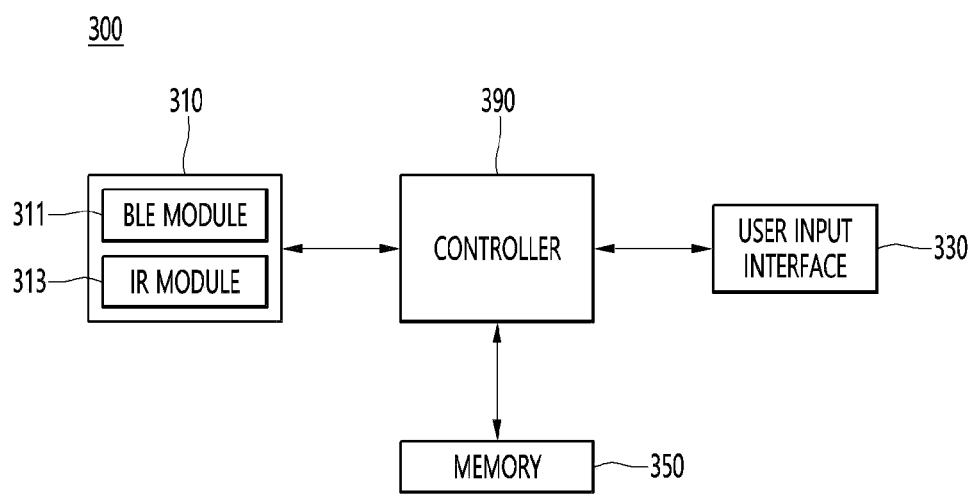
FIG. 3 is a block diagram for describing a configuration of a remote control device according to an embodiment of the present disclosure.

FIG. 3 is a block diagram for describing a configuration of a remote control device according to an embodiment of the present disclosure.

Referring to FIG. 3, a remote control device 300 may include a wireless communication interface 310, a user input interface 330, a memory 350, and a controller 390.

The wireless communication interface 310 may be an interface for performing wireless communication with the A/V transmitting apparatus 100 or the A/V receiving apparatus 200.

The wireless communication interface 310 may include a Bluetooth Low Energy (BLE) module 311 and an InfraRed (IR) module 313.

The BLE module 311 may transmit a signal for controlling the operation of the A/V transmitting apparatus 100 to the A/V transmitting apparatus 100.

The BLE module 311 may transmit a signal for triggering a pairing operation of the A/V transmitting apparatus 100 to the A/V transmitting apparatus 100.

The user input interface 330 may include a keypad, a button, a touch pad, a touch screen, or the like.

The user input interface 330 may generate a control command for controlling the operation of the A/V transmission apparatus 100 or the A/V reception apparatus 200 according to a user's operation command.

When the user input interface 330 includes a hard key button, the user may operate the hard key through an operation of pushing the hard key button.

The user input interface 330 may include various types of input means that can be operated by the user, such as a scroll key or a jog key.

The memory 350 may store a program for the operation of the controller 390 and may temporarily store input/output data.

The controller 390 may control operation related to an application program and generally control overall operation of the remote control device 300.

Figure 4:
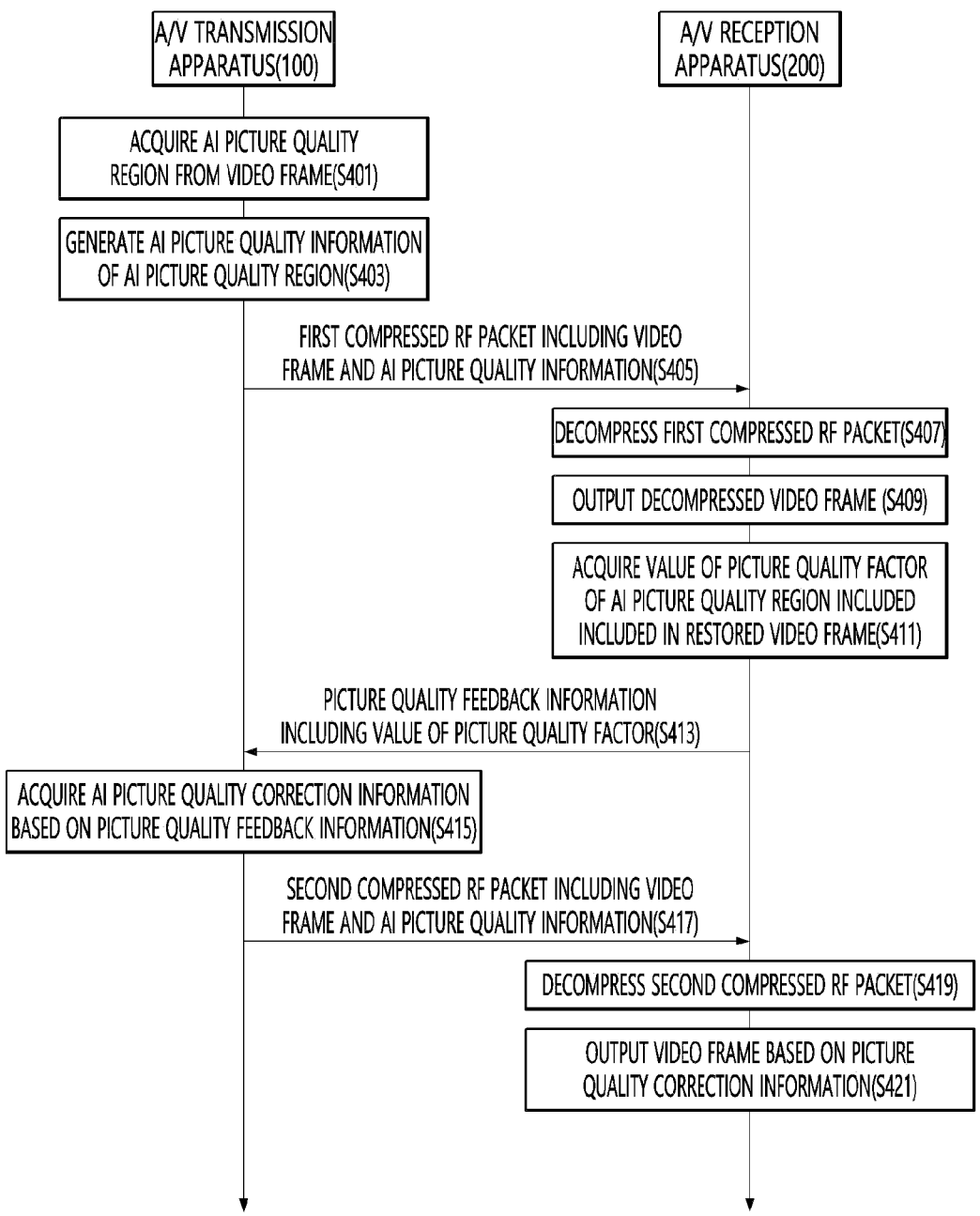
FIG. 4 is a ladder diagram for describing a method of operating a wireless display system according to an embodiment of the present disclosure.

FIG. 4 is a ladder diagram for describing a method of operating a wireless display system according to an embodiment of the present disclosure.

The processor 190 of the A/V transmission apparatus 100 may acquire an AI picture quality region of a video frame (S401).

In one embodiment, the AI picture quality region may be a region for emphasizing the value of a specific picture quality factor among the entire area of the image frame. The AI picture quality region may be a region in which the values of one or more picture quality factors are set differently from other regions among the entire area of the video frame.

For example, the AI picture quality region may be a region representing a specific object, such as a human face or a building.

In another embodiment, the AI picture quality region may vary depending on the genre of a video. For example, when the genre of a video is a movie, the AI quality region may be the entire region of the video frame.

As described above, the AI picture quality region may be a region for emphasizing values of a specific picture quality factor in a partial region or the entire region.

The picture quality factor may be any one of sharpness, brightness, luminance, and contrast.

In one embodiment, the processor 190 may extract an AI picture quality region from the entire region of a video frame using a feature point extraction technique. The feature point extraction technique may be a technique for extracting a point for identifying an object included in a video frame. In general, a feature point may be a corner point that forms a corner of an object. Known techniques may be used as the feature point extraction method.

Figure 5:
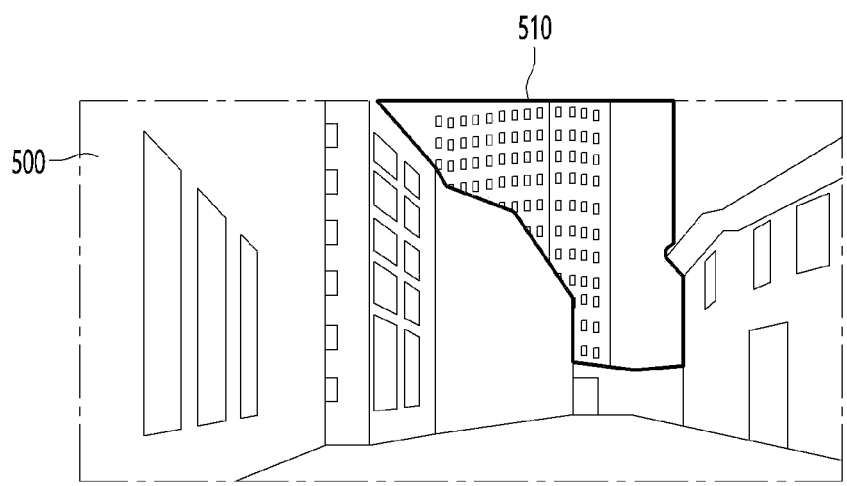
FIG. 5 is a diagram for describing an AI picture quality region according to an embodiment of the present disclosure.

FIG. 5 is a diagram for describing an AI picture quality region according to an embodiment of the present disclosure.

Referring to FIG. 5, a video frame 500 may include an AI picture quality region 510. The AI picture quality region 510 may be a region representing a building among objects included in the video frame 500.

The processor 190 may extract a plurality of feature points included in the region representing the building and acquire the AI picture quality region 510 connecting the plurality of extracted feature points.

The processor 190 may acquire values of one or more picture quality factors for the AI picture quality region 510 using an picture quality factor determination model.

Description will be given referring again to FIG. 4.

The processor 190 of the A/V transmission apparatus 100 may generate AI picture quality information in the acquired AI picture quality region (S403).

The processor 190 may generate AI picture quality information including values of one or more picture quality factors for the AI picture quality region.

The processor 190 may determine values of one or more picture quality factors suitable for the acquired AI picture quality region.

The processor 190 may acquire AI picture quality information for the AI picture quality region based on the picture quality factor determination model.

The picture quality factor determination model may be an artificial neural network-based model supervised through deep learning or machine learning algorithms.

The picture quality factor determination model may be a supervised learning model based on a training data set including object image data and one or more picture quality factor values labeled thereto.

The picture quality factor determination model may be stored in the memory 140 of the A/V transmission apparatus 100.

The processor 190 may acquire values of one or more picture quality factors through the picture quality factor determination model by using an image for the AI picture quality region as input data.

The AI picture quality information may include position information indicating a position at which the AI picture quality region is to be displayed on a display. That is, when the AI picture quality region is a partial region of the video frame, the AI picture quality information may include coordinate information of the AI picture quality region.

The reason for this is to receive a feedback on the actual measured values of picture quality factors for the AI picture quality region in the future.

The processor 190 of the A/V transmission apparatus 100 may transmit a first compressed packet including a video frame and AI picture quality information for an AI picture quality region to the A/V reception apparatus 200 through the RF transmitting module 150 (S405).

The encoder of the processor 190 may compress a packet including a video frame, AI picture quality information, and picture quality information for a region other than the AI picture quality region to generate the first compressed packet.

The processor 190 may transmit the first compressed packet to the RF receiving module 240 of the A/V reception apparatus 200 through the RF transmitting module 150 including a plurality of antenna modules.

The microcomputer 290 of the A/V reception apparatus 200 may decompress the received first compressed packet (S407) and output the decompressed video frame (S409).

The microcomputer 290 may decompress the first compressed packet through a decoder.

The microcomputer 290 may output the video frame to a display 260 based on the AI picture quality information according to the decompression result.

The microcomputer 290 of the A/V reception apparatus 200 may acquire the value of the picture quality factor of the AI picture quality region included in the decompressed video frame (S411).

The microcomputer 290 may acquire values of one or more picture quality factors for the AI picture quality region using coordinate information of the AI picture quality region included in the AI picture quality information.

That is, the microcomputer 290 may identify the AI picture quality region through the coordinate information of the AI picture quality region included in the AI picture quality information. The microcomputer 290 may measure the values of one or more picture quality factors for the identified AI picture quality region.

The microcomputer 290 may measure one or more of sharpness, contrast, and brightness for the AI picture quality region using technology to be known.

The microcomputer 290 of the A/V reception apparatus 200 may transmit picture quality feedback information including the value of the picture quality factor, which is measured through the RF receiving module 240, to the A/V transmission apparatus 100 (S413).

The microcomputer 290 may transmit the picture quality feedback information to the A/V transmission apparatus 100 for picture quality correction for the AI picture quality region by the A/V transmission apparatus 100.

In one embodiment, the microcomputer 290 may transmit the picture quality feedback information to the A/V transmission apparatus 100 in real time.

In another embodiment, when a difference between the value of the picture quality factor of the AI picture quality region included in the AI picture quality information and the measured value of the picture quality factor of the AI picture quality region is greater than or equal to a preset value, the microcomputer 290 may transmit the picture quality feedback information to the A/V transmission apparatus 100.

It is assumed that the sharpness of the AI picture quality region included in the AI picture quality information is 10, the actually-measured sharpness is 7, and the preset value is 2.

As the network environment deteriorates and packets transmitted from the A/V transmission apparatus 100 to the A/V reception apparatus 200 are lost, the difference between the two values is 3, which is greater than the preset value 2, so that the microcomputer 290 may transmit a sharpness value 7 in the AI picture quality region to the A/V transmission apparatus 100.

The processor 190 of the A/V transmission apparatus 100 may acquire AI picture quality correction information for the AI picture quality region based on the picture quality feedback information (S415).

The processor 190 may acquire an AI picture quality correction value based on the difference between the value of the picture quality factor of the AI picture quality region and the value of the picture quality factor included in the picture quality feedback information.

For example, when the sharpness of the AI picture quality region first processed in the A/V transmission apparatus 100 is 10 and the sharpness included in the picture quality feedback information is 7, the difference value in sharpness may be 3.

The processor 190 may perform processing such that the difference value in sharpness 3 is further reflected to the AI picture quality region. Specifically, the processor 190 may increase the existing sharpness of the AI picture quality region from 10 to 13. The value of increased sharpness may be the AI picture quality correction value.

The AI picture quality correction information may include adjusted values of one or more picture quality factors.

The processor 190 of the A/V transmission apparatus 100 may transmit a second compressed packet including a video frame and AI picture quality correction information to the RF receiving module 240 through the RF transmitting module 150 (S417).

The processor 190 may compress the AI picture quality correction information including the value of the corrected picture quality factor for an AI picture quality region together with the video frame to generate the second compressed packet.

The microcomputer 290 of the A/V reception apparatus 200 may decompress the received second compressed packet (S419) and output the video frame based on the AI picture quality correction information (S421).

The microcomputer 290 may correct the value of the picture quality factor of the AI picture quality region based on the AI picture quality correction information.

That is, the microcomputer 290 may adjust the value of a first picture quality factor (before feedback) to the value of a second picture quality factor (after feedback) for the AI picture quality region.

The microcomputer 290 may apply the adjusted value of the second picture quality factor to the AI picture quality region and output the video frame to which the adjusted value of the picture quality factor has been applied.

According to an embodiment of the present disclosure, it is possible to adjust the value of the picture quality factor for the AI picture quality region, in real time, even when the network environment deteriorates. Accordingly, AI picture quality may be maintained even after wireless transmission of video signals.

Figure 6:
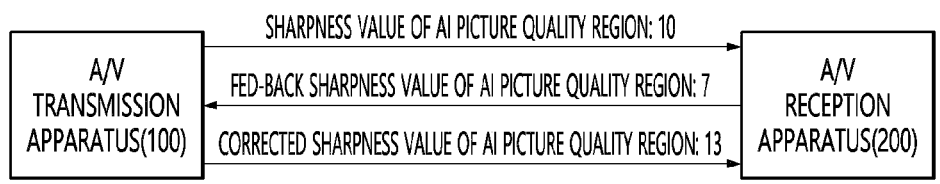
FIG. 6 is a diagram for describing a process in which the value of an picture quality factor for an AI picture quality region is corrected, according to an embodiment of the present disclosure.

FIG. 6 is a diagram for describing a process in which the value of an picture quality factor for an AI picture quality region is corrected, according to an embodiment of the present disclosure.

Hereinafter, a description will be given by taking the AI picture quality region 510 of FIG. 5 as an example.

The A/V transmission apparatus 100 may extract the AI picture quality region 510 from the video frame 510.

Thereafter, the A/V transmission apparatus 100 may determine the sharpness value of the AI picture quality region 510 to be 10, and transmit the determined sharpness value 10 and the coordinate information of the AI picture quality region 510 to the A/V reception apparatus 200.

The A/V reception apparatus 200 may measure the sharpness value for the AI picture quality region 510 based on the coordinate information of the AI picture quality region 510.

The A/V reception apparatus 200 may transmit the measured sharpness value 7 to the A/V transmission apparatus 100 as feedback.

The A/V transmission apparatus 100 may compare the sharpness value 7 for the AI picture quality region 510 received from the A/V reception apparatus 200 with an existing sharpness value 10.

The A/V transmission apparatus 100 may acquire a difference 3 between the existing sharpness value 10 and the fed-back sharpness value 7, and add 3 to the existing sharpness value 10. The A/V transmission apparatus 100 may acquire the summed sharpness value 13 as the AI picture quality correction value. Adding up sharpness values is merely an example method.

The A/V transmission apparatus 100 may transmit the corrected sharpness value 13 for the AI picture quality region 510 to the A/V reception apparatus 200.

Even though the A/V transmission apparatus 100 sets the compression ratio high and transmits compressed packets due to a deteriorated network environment, the A/V transmission apparatus 100 has set the sharpness value of the AI picture quality region 510 in consideration of this.

Even when data loss occurs during the decompression of a packet compressed at a high compression ratio, the sharpness value of the AI picture quality region 510 may be sufficiently maintained.

As described above, according to an embodiment of the present disclosure, in a wireless display system, even when network quality deteriorates, AI picture quality for videos may be sufficiently maintained.

Accordingly, a user may experience the AI picture quality for videos without any inconvenience, regardless of the network environment.

FIGS. 7 to 10 are diagrams showing comparison of measured SNR and compression ratio when AI picture quality correction is performed under LOS (Line Of Sight) conditions and NLOS (Non-Line Of Sight) conditions.

According to the embodiment of FIG. 4, the AI picture quality correction is an embodiment in which the value of the AI picture quality factor is fed back to the A/V transmission apparatus 100 in real time, and accordingly, the A/V transmission apparatus 100 corrects and transmits the value of the AI picture quality factor in real time.

Figure 7:
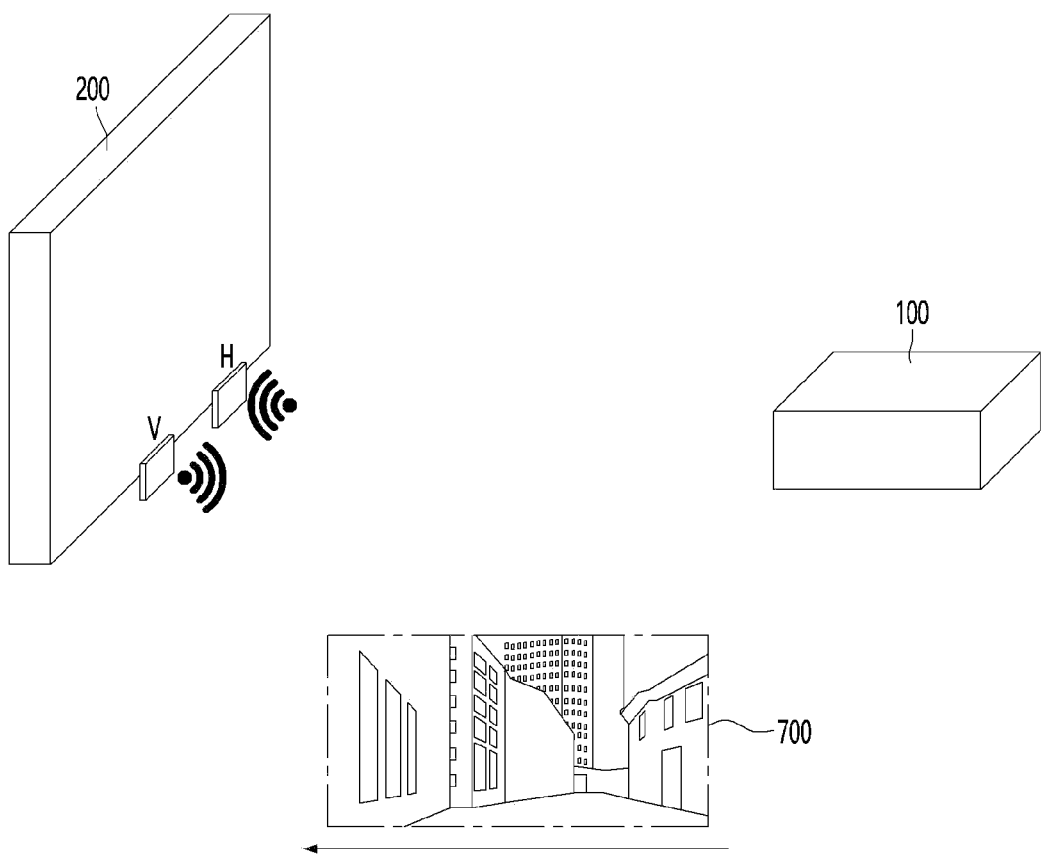
Figure 8:
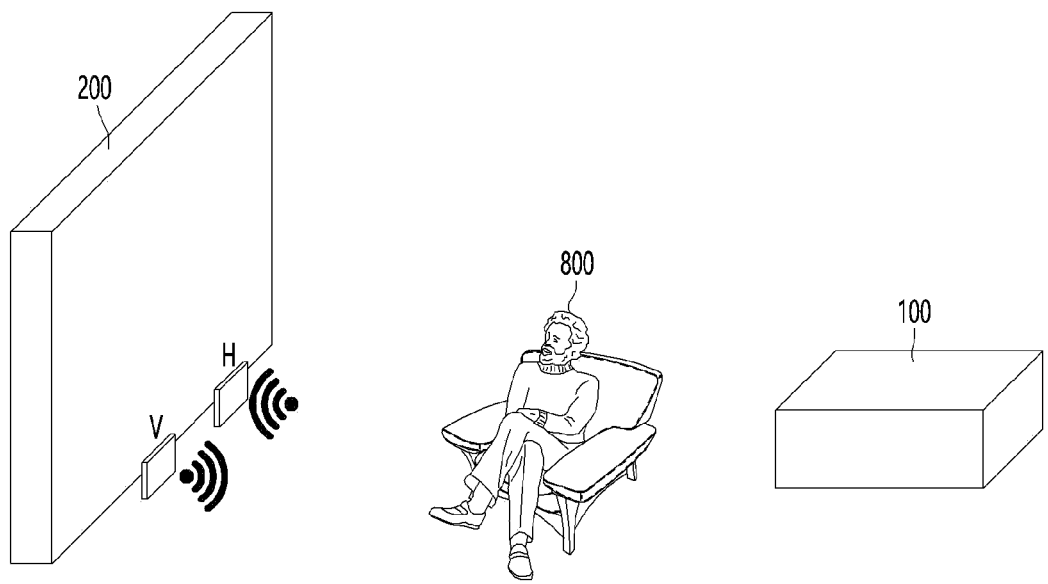

In FIGS. 7 and 8, the A/V transmission apparatus 100 may transmit video data 700 to the A/V reception apparatus 200.

First, as shown in FIG. 7, an LOS condition may be a condition that there are no obstacles between the A/V transmission apparatus 100 and the A/V reception apparatus 200.

As shown in FIG. 8, an NLOS condition may be a condition aht an obstacle 800 exists between the A/V transmission apparatus 100 and the A/V reception apparatus 200.

Accordingly, under the LOS condition, the network quality between the A/V transmission apparatus 100 and the A/V reception apparatus 200 is better than that under the NLOS condition.

The microcomputer 290 of the A/V reception apparatus 200 may measure a signal to noise ratio (SNR) and a compression ratio under each of the LOS condition and the NLOS condition.

The microcomputer 290 of the A/V reception apparatus 200 may measure the SNR and the compression ratio from video signals received under each of the LOS condition and the NLOS condition.

The compression ratio may indicate the magnification at which the A/V transmission apparatus 100 compresses the video signal.

The compressed packet received by the A/V reception apparatus 200 may include information about the compression ratio.

The microcomputer 290 of the A/V reception apparatus 200 may acquire the compression ratio in the process of decompressing compressed packets through a decoder.

In another embodiment, the A/V transmission apparatus 100 may transmit the compression ratio to the A/V reception apparatus 200.

Figure 9:
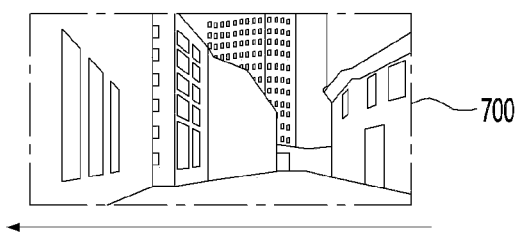

Referring to FIG. 9, under the LOS condition, when AI picture quality correction is not performed, the measured SNR may be 30 dB. Under the NLOS condition, when AI picture quality correction is not performed, the measured SNR may be 10 dB.

Under the NLOS condition, when AI picture quality correction is not performed, the network quality is lower than in the LOS condition, so that the SNR value decreases.

Conversely, when AI picture quality correction is performed under the LOS condition and the NLOS condition, the measured SNR may be the same at 30 dB.

This is because, under the NLOS condition, the values of the picture quality factors in the AI picture quality region are automatically adjusted (performing AI picture quality correction) and transmitted to the A/V reception apparatus 200, resulting in the effect of the network quality remaining the same.

Referring to FIG. 10, under the LOS condition, when AI picture quality correction is not performed, the measured compression ratio may be 8 times. Under the NLOS condition, when AI picture quality correction is not performed, the measured compression ratio may be 16 times.

This is because, when AI picture quality correction is not performed under the NLOS condition, the network quality is lower than in the LOS condition, so that the A/V transmission apparatus 100 needs to transmit packets by increasing the compression ratio.

Conversely, when AI picture quality correction is performed under the LOS condition and the NLOS condition, the measured compression ratios may be the same which is 8 times.

This is because under the NLOS condition, the values of the picture quality factors in the AI picture quality region are automatically adjusted (performing AI picture quality correction) and transmitted to the A/V reception apparatus 200 to remove a need to adjust the compression ratio in consideration of network quality.

In this way, when the measured SNR or compression ratios are the same under the LOS condition and the NLOS condition, it can be seen that AI picture quality correction, which is an embodiment of the present disclosure, has been performed.

Figure 11:
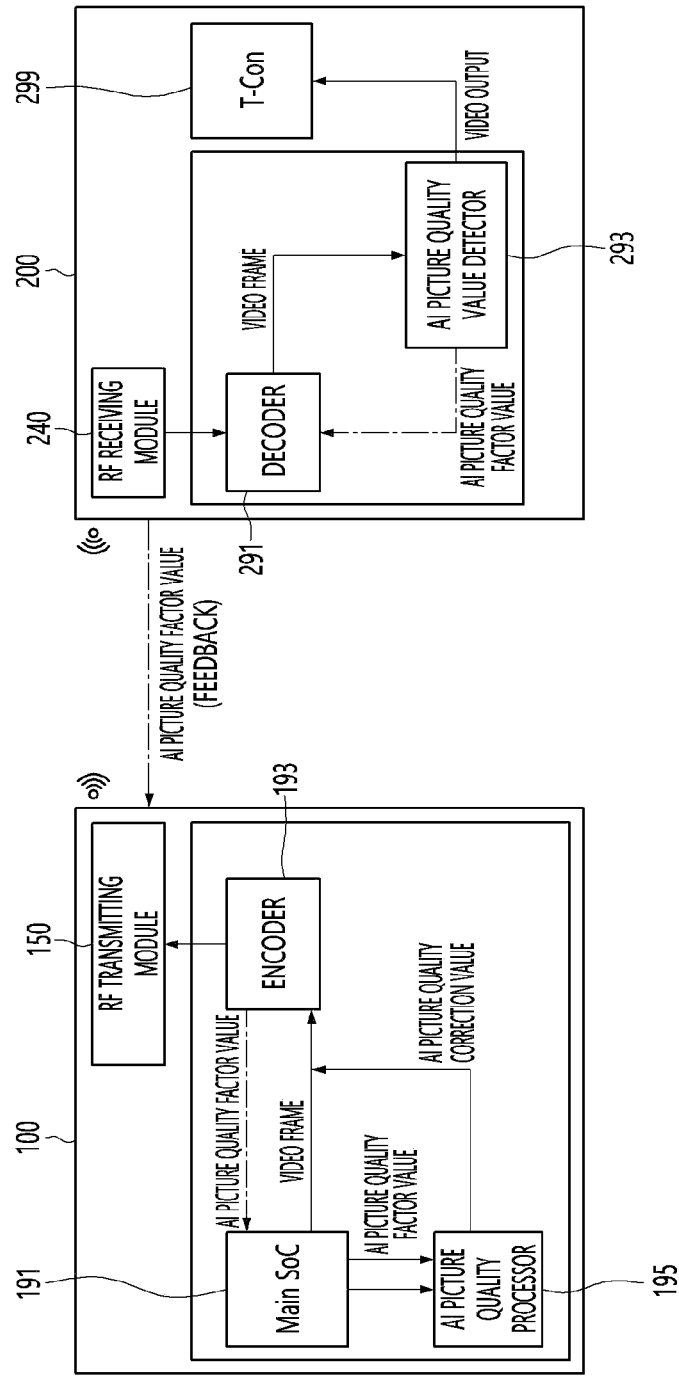
FIG. 11 is a diagram for describing a detailed configuration of a wireless display system according to an embodiment of the present disclosure.

FIG. 11 is a diagram for describing a detailed configuration of a wireless display system according to an embodiment of the present disclosure.

Referring to FIG. 11, a processor 190 of an A/V transmission apparatus 100 may include a main Soc 191, an encoder 193, and an AI picture quality processor 195.

The main Soc 191 may transmit a video frame corresponding to a content video to the encoder 193.

The main SoC 191 may determine whether AI picture quality is applied to the content video.

The main SoC 191 may determine whether AI picture quality is applied to the content video according to the genre of the content video. The main SoC 191 may determine that AI picture quality needs to be applied to the content video when the genre of the content video is a movie.

In another embodiment, the main SoC 191 may determine that the value of the AI picture quality factor needs to be applied to a partial region of the content video.

When the AI picture quality region is extracted, the main SoC 191 may transmit coordinate information for the AI picture quality region and values of one or more AI picture quality factors for the AI picture quality region to the encoder 193.

The encoder 193 may compress video signals and AI picture quality information. The encoder 193 may generate a compressed RF packet through color sampling and transmit the generated RF packet to the RF transmitting module 150.

The RF transmitting module 150 may transmit the compressed RF packet to the RF receiving module 240 of the A/V reception apparatus 200.

The AI picture quality processor 195 may generate an AI picture quality correction value based on the value of the AI picture quality factor for the AI picture quality region received from the A/V reception apparatus 200, and forward the generated AI picture quality correction value to the encoder 193.

The microcomputer 290 of the A/V reception apparatus 200 may include a decoder 291 and an picture quality value detector 293.

The decoder 291 may restore an RF packet received by the RF receiving module 240.

The decoder 291 may restore a video signal and AI picture quality information included in the compressed RF packet.

The picture quality value detector 291 may extract an AI picture quality region from the AI picture quality information and detect the value of the picture quality factor of the extracted AI picture quality region.

The picture quality factor may be any one of luminance, brightness, gradation, and sharpness.

The picture quality value detector 293 may transmit the value of the picture quality factor of the AI picture quality region to the decoder 291.

The picture quality value detector 293 may output the video frame restored through the decoder 291 to a timing controller 299.

The RF receiving module 240 may transmit picture quality value information to the RF transmitting module 150.

The value of the AI picture quality factor may be fed back to the A/V transmission apparatus 100.

The main Soc 191 may transmit the received value of the AI picture quality factor to the AI picture quality processor 195.

The AI picture quality processor 195 may be included in the main SoC (191).

As described above, it is possible to maintain a special picture quality effect for the AI picture quality region through a feedback process for the value of the picture quality factor of the AI picture quality region.

Accordingly, users may watch videos with special picture quality effects for the AI picture quality region.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

The invention claimed is:

1. An Audio/Video (A/V) reception apparatus comprising:
a display;
a radio frequency (RF) reception module configured to:
receive a compressed RF packet from an A/V transmission apparatus, the compressed RF packet including a video frame corresponding to a content video, and AI picture quality information regarding an AI picture quality region in which the value of the picture quality factor including one of luminance, brightness, gradation, and sharpness is set differently from other regions in at least a partial region of the content video; and a microcomputer configured to:

decompress the received compressed RF packet, output the video frame to the display based on the AI picture quality information according to the decompression result, identify the AI picture quality region included the decompressed video frame, measure the values of one or more picture quality factors for the identified AI picture quality region, transmit picture quality feedback information including the measured value of the picture quality factor to the A/V transmission apparatus, receive, from the A/V transmission apparatus, a picture quality correction value in which the value of the picture quality factor of the AI picture quality region has been corrected based on the picture quality feedback information, and output the video frame via the display on the basis of the received picture quality correction value.

2. The A/V reception apparatus of claim 1, wherein the microcomputer is configured to apply the picture quality correction value to the AI picture quality region to output the video frame through the display.

3. The A/V reception apparatus of claim 1, wherein the AI picture quality information includes position information of the AI picture quality region indicating a position at which the AI picture quality region is to be displayed on the display, and wherein the microcomputer is configured to measure the value of the picture quality factor in the AI picture quality region based on the position information.

4. The A/V reception apparatus of claim 1, wherein the AI picture quality region includes a specific object and is an area in which the value of the picture quality factor is set differently from other regions among an entire region of the video frame.

5. The display device of claim 1, wherein the AI picture quality region is an entire region of the content video when genre of the content video is a movie.

6. The display device of claim 1, wherein the microcomputer is configured to transmit the measured value of the picture quality factor to the A/V transmission apparatus when a difference between the value of the picture quality factor of the AI picture quality region included in the AI picture quality information and the measured value of the picture quality factor of the AI picture quality region is greater than or equal to a preset value.

7. A wireless display system comprising:

an audio/video (A/V) transmission apparatus configured to generate a radio frequency (RF) packet, compress a generated RF packet and transmit a compressed RF packet to an A/V reception apparatus via RF communication, the compressed RF packet including a video frame corresponding to a content video, and AI picture quality information regarding an AI picture quality region in which the value of the picture quality factor including one of luminance, brightness, gradation, and sharpness is set differently from other regions in at least a partial region of the content video; and the A/V reception apparatus configured to decompress the received compressed RF packet, output the video frame to the display based on the AI picture quality information according to the decompression result, identify the AI picture quality region included the decompressed video frame, measure the values of one or more picture quality factors for the identified AI picture quality region, transmit picture quality feedback information including the measured value of the picture quality factor to the A/V transmission apparatus receive, from the A/V transmission apparatus, a picture quality correction value in which the value of the picture quality factor of the AI picture quality region has been corrected, based on the picture quality feedback information, and output the video frame via a display on the basis of the received picture quality correction value.

8. The wireless display system of claim 7, wherein the A/V reception apparatus is configured to apply the picture quality correction value to the AI picture quality region to output the video frame through the display.

9. The wireless display system of claim 7, wherein the AI picture quality information includes position information of the AI picture quality region indicating a position at which the AI picture quality region is to be displayed on the display, and wherein the A/V reception apparatus is configured to measure the value of the picture quality factor in the AI picture quality region based on the position information.

10. The wireless display system of claim 7, wherein the AI picture quality region includes a specific object and is an area in which the value of the picture quality factor is set differently from other regions among all regions of the video frame.

11. The wireless display system of claim 7, wherein the AI picture quality region is an entire region of the content video when genre of the content video is a movie.

12. The wireless display system of claim 7, wherein the A/V reception apparatus is configured to transmit the measured value of the picture quality factor to the A/V transmission apparatus when a difference between the value of the picture quality factor of the AI picture quality region included in the AI picture quality information and the measured value of the picture quality factor of the AI picture quality region is greater than or equal to a preset value.

13. The A/V reception apparatus of claim 7, wherein the A/V transmission apparatus is configured to acquire the picture quality correction value of the AI picture quality region on the basis of the value of the picture quality factor received from the A/V reception apparatus.

* * * * *